United States Patent [19]
Parker et al.

[11] Patent Number: 5,956,388
[45] Date of Patent: Sep. 21, 1999

[54] SECURITY SYSTEM WITH TWO SIGNAL REPORTING

[75] Inventors: James Parker, North York; Reinhart K. Pildner, Brampton, both of Canada

[73] Assignee: Digital Security Controls Ltd.

[21] Appl. No.: 08/838,012

[22] Filed: Apr. 22, 1997

[51] Int. Cl.[6] ................................................. H04M 11/04
[52] U.S. Cl. ................................ 379/42; 379/45; 379/50
[58] Field of Search .................................. 379/37–51, 6, 379/27–32

[56] References Cited

U.S. PATENT DOCUMENTS

| | | |
|---|---|---|
| 4,097,696 | 6/1978 | Tal ............................................. 379/49 |
| 4,442,320 | 4/1984 | James et al. . |
| 4,903,292 | 2/1990 | Dillon . |
| 4,937,851 | 6/1990 | Lynch et al. . |
| 5,465,297 | 11/1995 | Azem ......................................... 379/40 |
| 5,822,423 | 10/1998 | Jehnert et al. ............................. 379/42 |

*Primary Examiner*—Wing F. Chan

[57] ABSTRACT

A security system having two distinct channels of communication and which uses a single communication device provides improved security. The system monitors a host of security alarm panels connected to a telephone system. A status signal is communicated between each control panel and a scanner placed at a switching station of the telephone system to confirm the integrity of the communication channel. An alarm event continues to be reported to a monitoring station using the telephone system in the normal manner.

13 Claims, 2 Drawing Sheets

SECURITY SYSTEM WITH TWO SIGNAL REPORTING

FIELD OF THE INVENTION

The present invention is directed to a security system where individual control panels are in communication with a monitoring station.

BACKGROUND OF THE INVENTION

A number of security systems have control panels which report to a monitoring station by telephone in the event that an alarm condition is sensed at the premise. The control panel typically is placed on the telephone line of the premise in front of the connection to the other telephone devices. The control panel can seize the line, when required, and place an outgoing call to the monitoring station.

Other security systems have provided a dedicated telephone line to the control panel and this obviously improves the security of the system, as the telephone line is always available to allow communication between the monitoring station and the control panel. Signals can be sent on the telephone line indicating that the control panel is functioning properly, and in the event that the control panel does not report to the monitoring station, an alarm condition or event can be determined by the monitoring station. The use of a dedicated line provides a much higher degree of reliability, however, there is a substantial increase in costs.

Other arrangements have been proposed for monitoring of the integrity of the communication to individual control panels. One such system is disclosed in U.S. Pat. No. 4,442,320. This system involves the use of a scanning device provided at the switching station of the Public Switch Telephone Network (PSTN) to which the individual control panel is connected. According to this system, a scanner is provided at the switching station and a separate subscriber terminal unit is provided at each premise. Reporting between the scanner and the subscriber terminal unit is completed directly over the telephone line to the switching station. Basically, the connection between the subscriber terminal unit and the scanner is a closed loop and it does not use the standard telephone protocol. The integrity of the telephone connection between the subscriber terminal unit and the scanner at the switching station is assured, as the scanner can send an interrogation signal at a low frequency to the control panel and the control panel can respond. The low frequency signal is typically outside of the audible range, and therefore, these signals can be transmitted even if the telephone is in normal use. In addition, this type of system is based on the scanner forming a connection with the subscriber terminal unit by sending a polling signal and is not able to independently communicate with equipment other than the scanner.

Unfortunately, the telephone lines between individual premises 4 and the switching station of a publicly switched telephone network can vary and there are often parts of the system which have been added which are unable to carry the low frequency signal. Therefore, most of these connections are limited to carrying a signal in the 300 to 3,000 Hz frequency range.

SUMMARY OF THE INVENTION

A security alarm control panel according to the present invention comprises a controller for receiving and processing signals from sensors and recognizing high priority events to be reported to a monitoring station using a telephone channel. The control panel has a communication arrangement for sending and receiving telephone signals in a conventional manner and includes a controller which provides the necessary logic for causing the communication arrangement to transmit signals reporting high priority events as well as to transmit a security signal on an ongoing basis. The security signal allows assessment of at least the integrity of the telephone channel without interrupting normal use of the channel. The controller, upon recognition of a high priority event, uses the communication arrangement to seize the telephone channel, outdial the monitoring station and thereafter report the high priority event to the monitoring station.

The security alarm control panel as set out above uses the same communication arrangement and controller for producing both security signals and signals reporting high priority events to monitoring stations.

According to an aspect of the invention, the communication arrangement includes a frequency generator capable of simultaneously generating two frequencies for DTMF (Dual Tone Modulated Frequencies) signals and the controller causes the frequency generator to generate at a given point in time either the security signal or the reporting signal.

According to yet a further aspect of the invention, the communication arrangement also allows for encryption of both the security signal and of the signal reporting high priority alarm events.

According to yet a further aspect of the invention, the control panel includes an off-hook detector which determines once a telephone channel is in use other than by the control panel. The controller causes the frequency generator to produce short bursts security signals when the telephone channel is in use to minimize disruption of the conventional use of the telephone channel.

According to yet a further aspect of the invention, the controller decreases the frequency of producing and transmitting the security signal when the telephone channel is in use.

According to yet a further aspect of the invention, the control panel produces security signals according to an algorithm known to the scanner and monitors the control panel at the appropriate times for the security signal.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
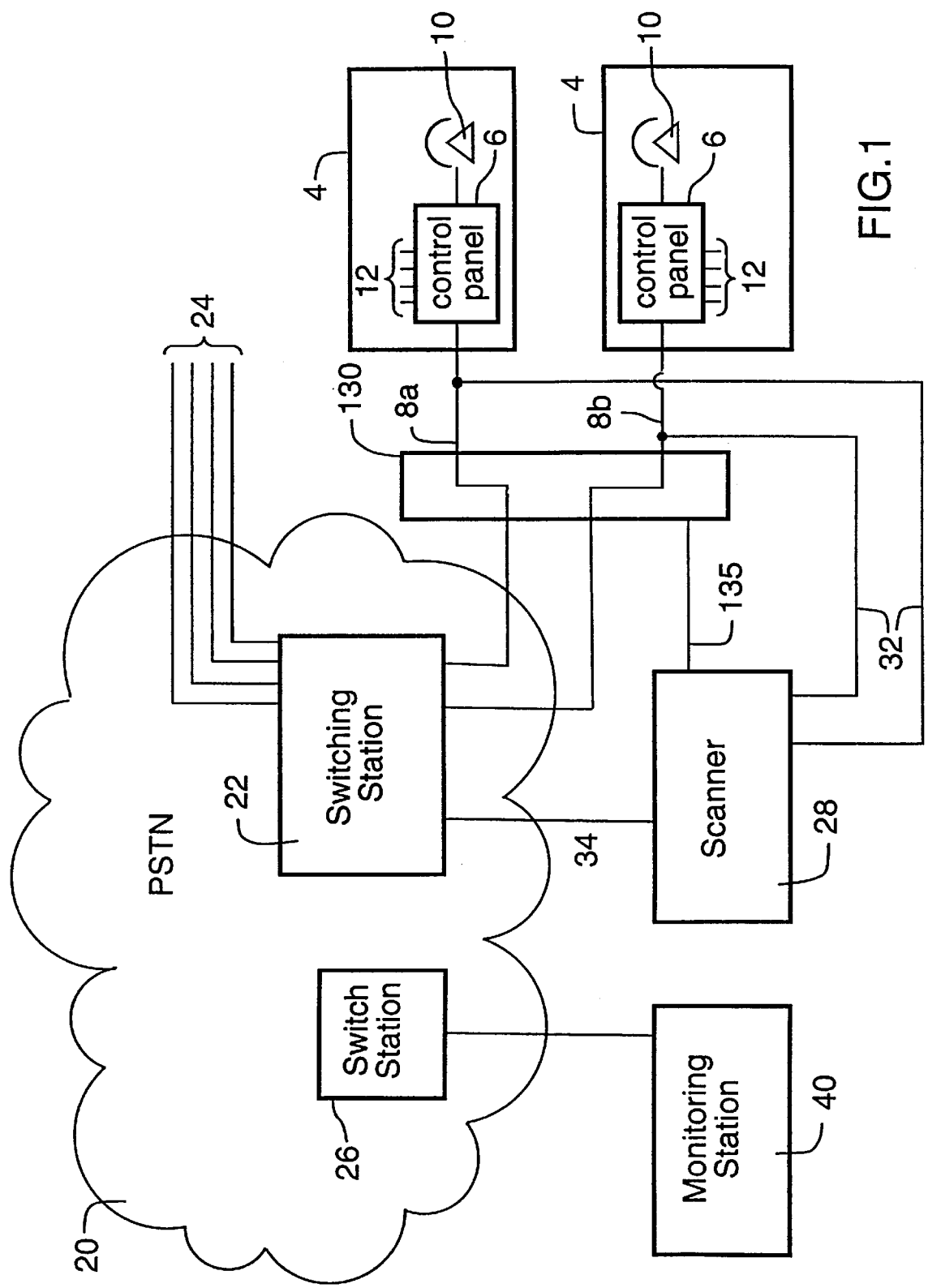
FIG. 1 shows the overall security system.

FIG. 1 shows a security monitoring system which monitors a host of separate premises 4. Each of these premises have their own control panel 6 and their own telephone service for the premises. In the example of FIG. 1, there is a telephone line 8a for one premise and a telephone line 8b for the second premise. These lines each hook into a separate control panel 6, which is located in front of the regular telephones 10 of the premise. With this arrangement, the control panel is able to seize the telephone line and cut off regular telephone service to the premise when necessary (i.e. if an alarm event occurs). Each control panel has a number of sensor inputs 12 for monitoring different areas or monitoring for different events.

Each of the control panels is connected to the Public Switched Telephone Network (PSTN) by the particular telephone channel, and in this case, each of the premises 4 are located to the same switching station 22 of the PSTN. The switching station 22 is the last switching station of the PSTN, and thus, the telephone lines serving that the premises 4 are always available at switching station 22. A separate scanner 28 is provided at the switching station 22 and has a direct connection to the telephone line serving each control panel 6. In this case, two connections are shown, namely 30 and 32. With this arrangement, the scanner can send signals to the control panel 6, such as an interrogation signal, and the control panel can also send signals to the scanner 28. The scanner 28 can be constantly connected to each control panel or can be selectively or in a predetermined manner connected to each control panel 6. With this arrangement, when the telephone 10 of a given premise is on-hook, the scanner 28 can use the channel to communicate with the control panel 6 directly without affecting normal operation of the telephone line. In the event that the telephone goes off-hook, this communication can cease or occur at only selected times in a manner to minimize interruption to conventional use. Also, for off-hook occurrences, the control panel can automatically transmit a security signal on a predetermined basis as opposed to in response to a polling signal transmitted from the scanner.

Figure 2:
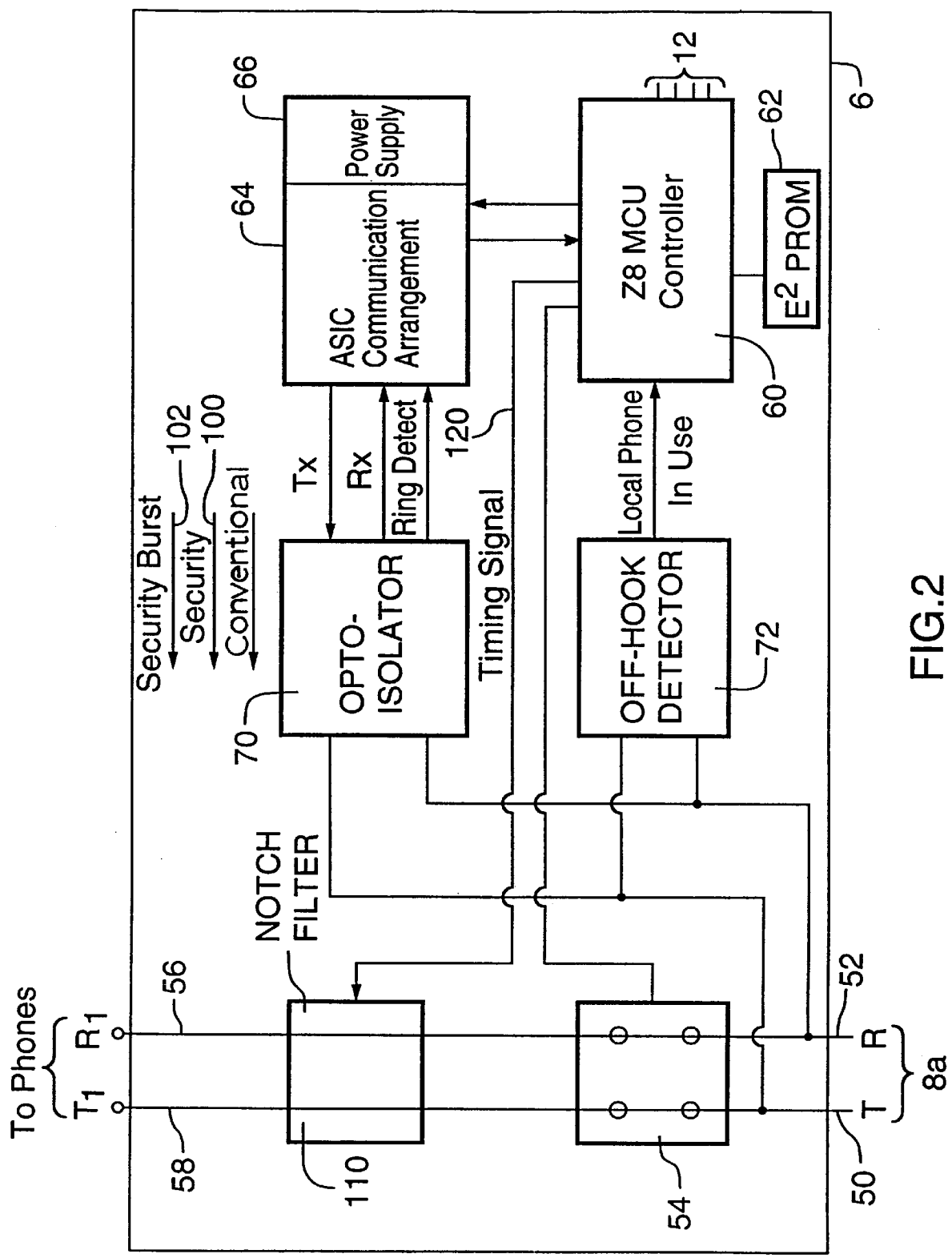
FIG. 2 is a schematic illustrating the control panel.

Operation of the control panel will be more fully described with respect to FIG. 2.

The control panel 6 shows line 8a the control panel to the PSTN. Line 8a is actually two lines 50 and 52 being the T and R lines. Each of these lines internal to the controller are connected to an off-hook detector 72 as well as to the optical isolator 70. A switch 54 can be selectively opened and closed by the controller 60. The switch 54 can break the connection of the telephone line 8a to the conventional telephones of the premise identified on lines 56 and 58. The optical isolator 70 merely serves to protect and isolate the controller 60 and the communication arrangement 64 from the telephone service.

The controller 60 has a number of sensor inputs identified as 12 and the controller provides the logic for processing of these signals. The controller, which preferably is a micro-controlled unit, instructs the communication arrangement 64. This is preferably an ASIC (Application Specific Integrated Circuit). The purpose of the communication arrangement is to allow effective communication with the telephone system and to also allow security signals to be sent. The exchange signals between the communication arrangement and the optical isolator are indicated.

With the arrangement as shown, the communication arrangement 64 is in constant communication with the telephone line 8a. When the telephone is on-hook, basically the full telephone channel is available to the communication arrangement for exchanging signals with the scanner 28 provided at the switching station 22. In this case, the security signal 100 can be provided on line 8a at any frequency between 300 and 3,000 Hz and be produced in response to a polling signal from the scanner and/or on a predetermined time basis.

In addition, if the controller 60 determines that any of the sensing inputs 12 indicate a high priority event to be reported to the monitoring station 40, the controller instructs the communication arrangement to seize the telephone line thereby opening switch 54, and outdialing to the monitoring station and using the telephone line 8a and the PSTN in the conventional manner. Under these conditions, obviously the normal telephone service to the premise is interrupted.

The off-hook detector 72 can recognize when the conventional telephones have been taken off-hook and the telephone channel 8a is in normal use. Under these circumstances, the sending of a security signal 100 would cause serious interruption to the communication, as security signal 100 is audible. To reduce the interruption, the controller 60, which now has knowledge of the off-hook detection, instructs the communication arrangement 64 to only send the security signal, indicated as 102, which would be a security burst (i.e. a very short duration signal sent at fixed time intervals). The duration of these intervals is variable, depending upon the degree of security required by the user. This signal may be sent every 30 seconds to every 90 seconds commonly or can be sent in response to a polling signal from the scanner. Security burst signal 102 is still audible to the user.

In order to further minimize disruption of communications between off-hook phone 10 and switch 22, control panel 6 includes "notch" filter circuit 110 to attenuate all signal levels within the "notch" frequency range from signals sent to phone 10. The "notch" frequency range is set to span the frequencies of security burst signal 102. "Notch" filter circuit 110 is selectively activated by timing signal 120 from controller 60. Controller 60 uses interval information of security burst signal 102 to determine when to activate timing signal 120.

While the intervals at which security burst signal 102 is transmitted is determined, the first security burst signal 102 may be injected on line 52 in response to a polling signal from the scanner or at a time determined by ASIC 64. As such, controller 60 may not activate timing signal 120 for the first security burst. However, controller 60 does activate timing signal 120 for each subsequent security burst signal 102. As such, phone 10, receives only the first security burst signal 102. When "notch" filter circuit 110 is activated, phone 10 receives no signals within the frequency range of "notch" filter circuit 110, including any intended communications and security burst signal 102.

In order to block transmission of security burst signal 102 to a party communicating with phone 10 on line 8, second "notch" filter circuit 130 is located on line 8 between scanner 28 and switching station 22. Second "notch" filter circuit 130 performs a similar function as "notch" filter circuit 110: attenuating a set band of frequencies. However, second "notch" filter circuit attenuates the signals sent to switching station 22. Timing signal 135 from scanner 28 activates second "notch" filter circuit 130. Again, as security burst signal 102 is sent on line 8 at regular known intervals, once the first security burst signal is sent, scanner 8 can activate second "notch" filter 130 during the expected intervals when security burst signals 102 are sent. When second "notch" filter circuit 130 is activated, connected party 10b will not hear the security burst signal 120 sent by panel 6.

With the system as described above, the controller 60 and the communication arrangement 64 are used to produce different types of signals to be transmitted either directly to a scanner or using the PSTN to communicate with a monitoring station. This arrangement allows for checking of the integrity of the telephone channel from time to time, while also allowing fast reporting of high priority events. In addition, the system can also report high priority events to the scanner for increased security. Such a communication would be reported by the scanner to the monitoring station.

According to a different aspect of the invention, as shown in FIG. 3, the controller is also connected to a separate line 8c associated with line 8a. Many telephone services have a four wire service and often the second service 8c is not used. In this case, the controller panel is used to output security signals on the unused line 8c and uses line 8a for reporting of high priority events to the monitoring station. It can be appreciated that line 8c does have a full connection to the switching station 22, however, it is not authorized for any further transmission over the PSTN. Thus, the scanner can be effectively connected to lines 8a and 8c for a given premise and can use each of these lines in the manner described. In addition, it can be appreciated that if both lines are being used at the particular premise, the controller 60 can monitor whether each line is in use and if one line is available, it can send the security signal over that line. In the event that both lines are in use, the security burst signal can alternately be sent over either line to minimize disruption while doubling the time on a given line between bursts or can interrupt one of the lines in preference to the other.

Another possible filtering system eliminates the security burst pulse 102 from line 8 by active cancellation of targeted frequencies. In this active system, when panel 8 detects the security burst pulse on line 8, it injects a series of signals at the exact frequencies of the burst pulse, but with a negative amplitude. This inverted set of signals is then inserted on line 8, wherein the inverted signals are added to the non-inverted signals of the security pulse. This produces a net null signal at the frequencies of the security pulse signal, which is transmitted to phone 10. A similar cancellation filter would replace second notch filter 130. While this system is technically feasible, it requires more signal processing than the "notch" filter system. As such, the active cancellation system is not as cost-effective as the "notch" filter system.

In a further embodiment of the invention, seizure of the telephone line, when the line is in use requires a certain time delay to go "on hook" to terminate the connection and then go "off hook" to start the communication to the monitoring station. Typically, this delay is in the order of less than five seconds. This time period preferably is used to send a signal to the scanner indicating an alarm event has occurred. This signal can include the address code of the control panel.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A security alarm control panel comprising a controller for receiving and processing signals from sensors and recognizing events to be reported to a monitoring station using a telephone channel, a communication arrangement for sending and receiving telephone signals, said controller causing said communication arrangement to transmit a security signal on an ongoing basis which allows assessment of at least the integrity of said telephone channel without interrupting normal use of the telephone channel, said controller upon recognition of a high priority event to be reported cooperating with said communication arrangement to seize the telephone channel, outdial the monitoring station and thereafter report the high priority event to the monitoring station, and wherein said control panel includes an off hook detector which determines when said telephone channel is in use other than by said control panel, said controller producing short burst security signals when said telephone channel is in use to minimize disruption of the normal use of the telephone channel.

2. A security alarm panel as claimed in claim 1 wherein said communication arrangement is only able to transmit a security signal or a high priority event at a given point in time.

3. A security control panel as claimed in claim 1 wherein said controller lengthens the time between transmissions of the security signal when the telephone channel is in use.

4. A security control panel as claimed in claim 3 including a filter arrangement for filtering the security signal from the telephone signal passed through the control panel to the telephone service of the premise and where said security signal is in a narrow frequency band.

5. A security control panel as claimed in claim 4 wherein said telephone channel is capable of transmitting within a known frequency range and said security signal is of a frequency at the low limit or upper limit of said known frequency range.

6. A security control panel as claimed in claim 4 wherein said filter arrangement is activated when said telephone channel is in normal use.

7. A security control panel as claimed in claim 4 wherein said security signal is of a frequency of about 300 Hz.

8. A security control panel as claimed in claim 4 wherein said security signal is of a frequency of about 3000 Hz.

9. A security alarm control panel comprising a controller for receiving and processing signals from sensors and recognizing events to be reported to a monitoring station using a telephone channel, a communication arrangement for sending and receiving telephone signals, said controller causing said communication arrangement to transmit a security signal on an ongoing basis which allows assessment of at least the integrity of said telephone channel without interrupting normal use of the telephone channel, said controller upon recognition of a high priority event to be reported cooperating with said communication arrangement to seize the telephone channel, outdial the monitoring station and thereafter report the high priority event to the monitoring station, said control panel including a filter arrangement for filtering the security signal from the telephone signal passed through the control panel to the telephone service of the premise and where said security signal is in a narrow audible frequency band.

10. A security control panel as claimed in claim 9 wherein said security signal is of a frequency of about 300 Hz.

11. A security control panel as claimed in claim 9 wherein said security signal is of a frequency of about 3000 Hz.

12. A security control panel as claimed in claim 9 wherein said telephone channel is capable of transmitting within a known frequency range and said security signal is of a frequency at the low limit or upper limit of said known frequency ranges.

13. A security control panel as claimed in claim 12 wherein said filter arrangement is activated when said telephone channel is in normal use.

* * * * *